United States Patent [19]

Huebscher

[11] Patent Number: 5,341,448

[45] Date of Patent: Aug. 23, 1994

[54] OPTICAL FIBER SPLICE

[75] Inventor: Laszlo Huebscher, New Brunswick, N.J.

[73] Assignee: Advanced Custom Applications, Inc., Belle Mead, N.J.

[21] Appl. No.: 922,848

[22] Filed: Jul. 30, 1992

[51] Int. Cl.[5] .............................................. G02B 6/38
[52] U.S. Cl. ........................................ 385/97; 385/68
[58] Field of Search ...................... 385/66, 67, 68, 69, 385/70, 95, 97, 98, 99

[56] References Cited

U.S. PATENT DOCUMENTS

| 4,730,892 | 3/1988 | Anderson et al. | 385/69 |
| 5,042,902 | 8/1991 | Huebscher et al. | 385/72 |
| 5,125,057 | 6/1992 | Aberson, Jr. et al. | 385/66 |

Primary Examiner—Rodney B. Bovernick
Assistant Examiner—John Ngo
Attorney, Agent, or Firm—Stroock & Stroock & Lavan

[57] ABSTRACT

An optical fiber splice for splicing the free ends of a pair of optical fibers together, the device including a housing and a capillary tube supported therein. Each end of the housing is formed of a chamfered surface. A collet partially sits within the tapered surface. A locking nut tightens the collet against the tapered surface tightening the collet about an optical fiber.

16 Claims, 2 Drawing Sheets

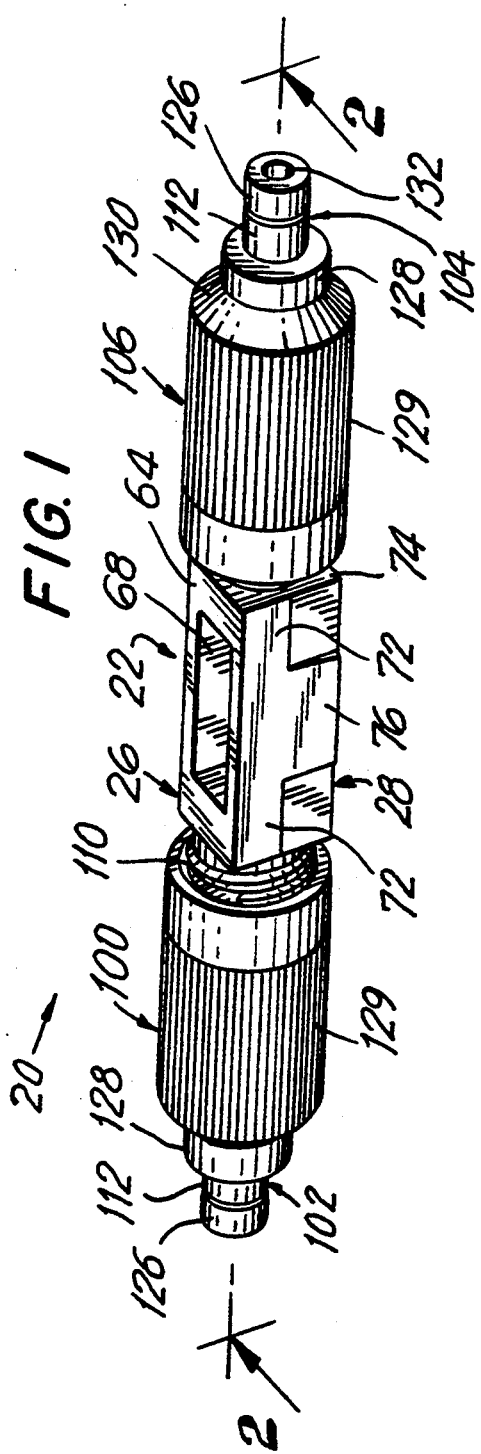
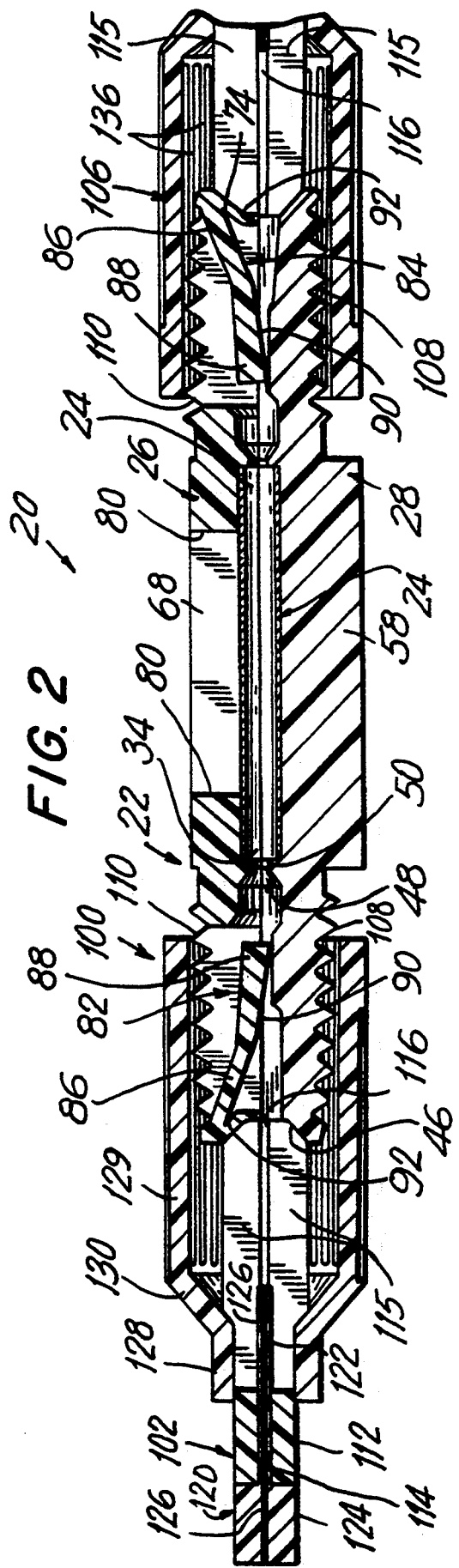

OPTICAL FIBER SPLICE

BACKGROUND OF THE INVENTION

This invention relates generally to optical fibers and in particular, to devices for splicing ends of a pair of optical fibers together.

Optical fibers have been widely employed for transmission of data in various systems. These systems require the use and mating of optical fibers extending from various data sources. An optical fiber acting as a glass-like conducting guide of a given length and of extremely small diameter frequently must be connected or spliced to the end of a similar fiber to enable it to serve as a system component. Because of the extremely small dimensions and cross-sectional areas of an optical fiber, the splicing of such fibers one to another so that the fibers are precisely aligned axially to minimize losses is of considerable importance and great difficulty. Several prior art devices are known in the art to achieve such splices. However, these prior art splices are difficult to use, have a complex construction, are overly large, overly expensive or ineffective.

One prior art device known from U.S. Pat. No. 5,042,902 issued to Huebscher et al. was an attempt to overcome the shortcomings of the prior art. The Huebscher et al. device includes a two section housing and a capillary tube. One section of the housing includes a pair of groove supports and a recess for receipt of capillary tube. The other section of the housing includes a pair of cantilever arms. Each support groove is disposed adjacent a respective end of the capillary tube and aligned with a longitudinally extending portion of the passageway extending through the capillary tube. The cantilever arms are disposed over the respective grooves to form respective spaces through which the free ends of the optical fibers are passed to guide the fibers into the capillary tube passageway where they abut each other. An ultraviolet ray activated, index matched, adhesive is provided. The adhesive is activated causing it to set to encapsulate and lock the various components of the splice in place against disconnection.

The Huebscher et al. prior art optical fiber splice has been satisfactory. However, it suffers from the disadvantage that although the cantilever arms do prevent against accidental slippage of the fibers from the housing, they do not provide sufficient force to maintain the optical fibers in proper alignment or within the housing when forces are applied to the fibers and/or the housing. Accordingly, an ultraviolet adhesive is utilized. However, the use of the ultraviolet adhesive because of its hardened encapsulated state prevents reuse of the optical fiber splice once the adhesive has been set. Accordingly, a simple optical fiber splice construction which provides sufficient force to maintain ends of optical fibers in proper alignment while allowing reuse is provided by the invention to overcome the short comings of the prior art.

SUMMARY OF THE INVENTION

Generally speaking, in accordance with the instant invention, an optical fiber splice includes a housing. A capillary tube is disposed within the housing. At least the bottom housing portion is formed with guide recesses therein for guiding the optical fibers towards the capillary tube. A collet is disposed at each end of the housing. Each collet having a channel to allow an optical fiber to pass therethrough. A first locking nut is mounted at one end of the housing and a second locking nut is mounted at the opposed end of the housing whereby the locking nut tightens the collet about the optical fiber with sufficient force to prevent the optical fiber from being accidentally removed from the housing when a force is applied to the optical fiber.

Accordingly, it is an object of the invention to provide an improved optical fiber splice.

Yet another object of the invention is to provide an optical fiber splice which is reusable.

Another object of the invention is to provide an optical fiber splice which maintains the optical fiber ends in proper orientation without the use of adhesive.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a perspective view of an optical fiber splice constructed in accordance with the invention;

FIG. 2 is a sectional view taken along line 2—2 of FIG. 1; and

DETAILED DESCRIPTION OF THE PREFERRED EMBODIMENT

Figure 3:
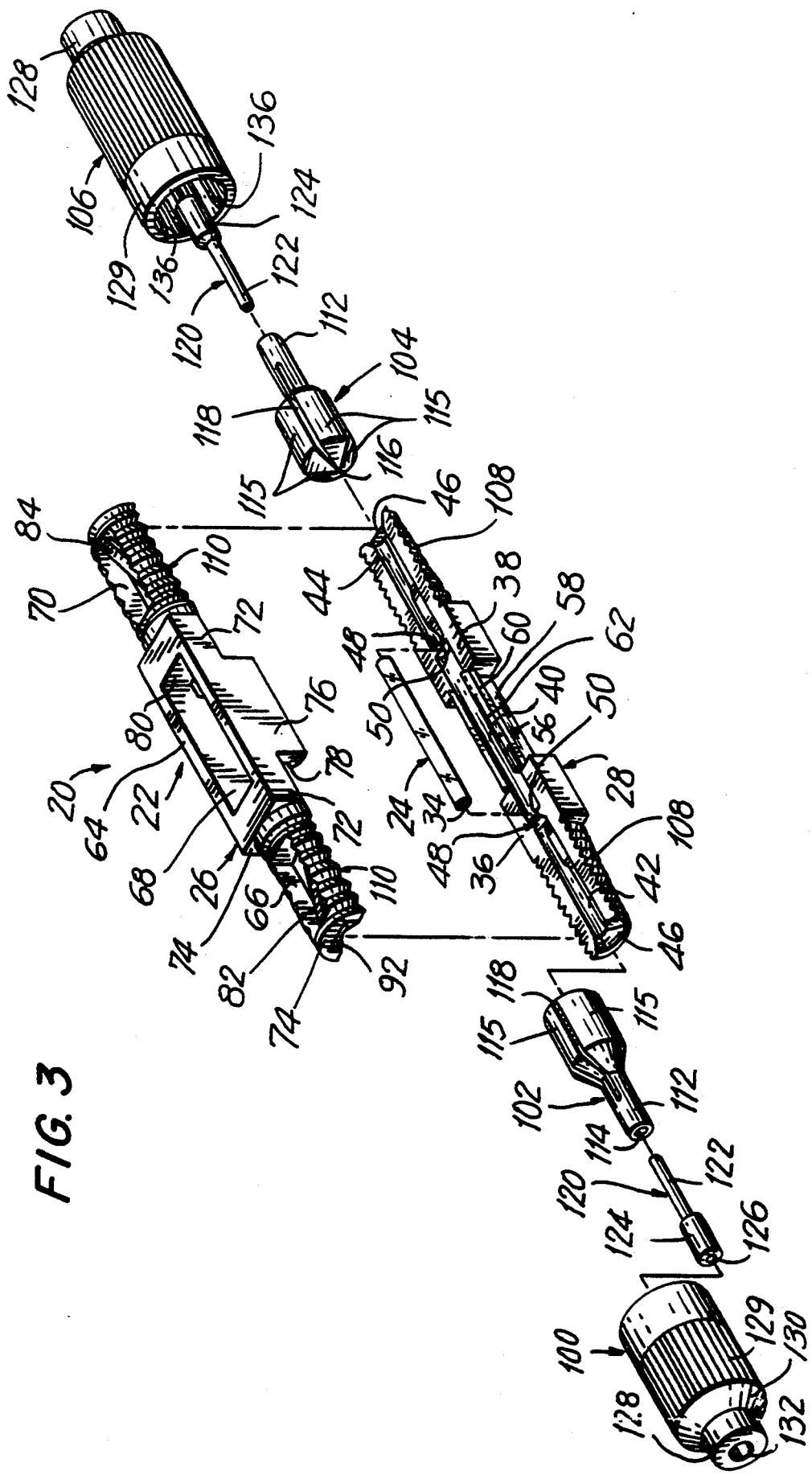
FIG. 3 is an exploded view of an optical fiber splice constructed in accordance with the invention.

Referring now to various figures of the drawing where like reference numerals refer to like parts there is shown at 20 in FIG. 1 one embodiment of the optical fiber splice of the subject invention.

As clearly shown in FIGS. 2 and 3 optical fiber splice 20 basically comprises a housing assembly 22 and a capillary tube 24. The housing assembly is in the form of a pair of sections 26 and 28. The section 26 forms an upper section or cover for the assembly while the section 28 forms a lower section or base. Both sections are formed of a suitable material, e.g., a liquid crystal polymer such as Vectra produced by Celenese, and are preferably molded. A first collet 102 rests partially within housing assembly 22 at one end of housing assembly 22 and a second collet 104 partially rests within housing assembly 22 at an opposed end thereof. A first locking nut 100 and a second locking nut 106 are mounted about housing assembly 22 and collets 102, 104 at respective ends thereof. Locking nuts 100, 106 are molded from glass filled nylon.

As will be described in detail later, the lower section 28 includes a recess therein for receipt of the capillary tube, and the two sections 26 and 28 are arranged to be snap-fit together to hold the capillary tube therein. Once so assembled, housing assembly 22 is arranged to receive from opposite ends thereof the free ends of a respective a pair of optical fibers to be joined, i.e., spliced together.

The optical fibers are each of conventional construction (either single mode or multimode) and include a central core of glass, with a glass cladding thereon. The fibers may be any suitable size e.g., 125–1000 microns in diameter. A plastic coating or buffer covers the fibers to protect them. The plastic buffers may be of any suitable thickness, e.g., 250–1000 microns.

In order to splice the free ends of the fibers together in a good light-transmissive, low loss interface the plastic buffer at the fiber free ends must be removed to leave the fibers bare, as is known from U.S. Pat. No. 5,042,902. Once the buffer is removed from each of the free ends of the optical fibers those fibers are inserted into the assembly 22 from opposite ends thereof until they meet (abut) in a good, light transmissive interface within the capillary tube 24.

If desired, an optical index matched gel can be located at the interface of the abutting fiber ends to prevent any light from leading out of the interface and to facilitate light transmission between the fiber ends. Otherwise, the interface may be left dry.

The sections 26 and 28 of the housing assembly 22 include various components (to be described in detail below) for facilitating the insertion of the optical fiber ends into the capillary tube and for holding them in place therein so that no adhesive is required.

As can be seen clearly in FIGS. 2 and 3, capillary tube 24 is an elongated member, preferably formed of glass, and having a central passageway 34 extending completely therethrough. The outer periphery of the capillary tube is circular in cross-section. The passageway 34, however, is not circular. Rather, it is polygonal, i.e., has three or more sides, in cross-section for reasons to be described later. In accordance with the preferred embodiment of the invention the passageway's cross-section is square, with the spacing between the opposed walls forming the passageway 34 being just slightly larger than the external diameter of the bare optical fiber, i.e., the optical fiber without the buffer. Moreover, the open ends of the passageway 34 are flared (conical in shape). Accordingly, the bare free end portions of the optical fibers can be readily slid into the capillary tube's passageway 34 so that they abut each other.

Base section 28 of housing assembly 22 basically comprises an elongated member having a pair of planar top surface 36 and 38, each disposed at respective opposite ends thereof with a recess 40 (FIG. 3) disposed therebetween. The recess is arranged to receive the capillary tube 24 and is thus of semi-circular cross-section, with its diameter being just slightly larger than that of the capillary tube, and with its length also being just slightly larger than the capillary tube. The top surface 36 and 38 include respective longitudinally extending grooves 42 and 44 in them. Each groove is arranged to receive and guide a respective optical fiber therethrough to facilitate the insertion of that optical fiber's free end into the passageway in the capillary tube. Thus, each longitudinally extending groove is semi-circular in cross-section and of a diameter just slightly larger than that of the plastic buffer coated optical fiber. The outer end 46 of each groove 42 and 44 is flared to cooperate with a similar flare in an associated end wall of the cover 26 (to be described below) to form an enlarged mouth or opening into which the optical fiber can be inserted when the sections 26 and 28 are assembled. The inner end 48 of each groove 42 and 44 is semi-conical in shape and tapers downward to a semi-circular recess 50 axially aligned with the central longitudinal axis of the capillary tube's passageway. The radius of the recess 50 is just slightly larger than that of the optical fiber without the buffer coating. Accordingly, when an optical fiber is inserted in either groove 42 and 44 and slid there along toward the capillary tube 24, the bare free end portion of that fiber will be guided by the recess 50 into the axially aligned passageway 34 of the capillary tube.

Base section 28 also includes a pair of undercut locking recesses 56 located in respective sidewalls 58 of the section at the middle thereof, i.e., at the location of the capillary tube receiving recess 40. The locking recesses 56 are located under respective over-hanging portions 60 of the sidewalls 58. The upper surface of each overhanging portion 60 is inclined downward to form a cam surface 62 arranged to cooperate with respective ones of a pair of locking tabs, to be described below, of the top section 26 to secure the sections 26 and 28 together.

Top section 26 of housing assembly 22 is an elongated member whose top wall 64 includes three openings or windows 66, 68 and 70 therein. A pair of sidewalls 72 project downward from the top wall on opposite sides thereof, and a pair end walls 74 project downward from the top wall at opposite ends thereof. A pair of locking tabs 76 project downward from the sidewalls 72 at the position of the central window 68. Each tab 76 terminates in an inwardly projecting flange 78. Each flange 78 forms a latch which is arranged to slide downward over inclined surface 62 of the base 28 to spread the tabs apart so that they may snap-fit into engagement with respective locking recesses 56 disposed thereunder, to thereby secure the two sections 26 and 28 together.

The underside of the top wall 64 of the top section 26 includes a pair of transverse walls 80, each of which includes a lower surface which, if desired, may engage a respective portion of the capillary tube when the assembly 22 is snap-fit together to prevent the capillary tube from moving in the recess 40. It may, however, be desired that the capillary tube be permitted to move slightly within the recess 40 in order to facilitate the entry of the optical fiber ends into the capillary tube's passageway. In such a case the lower surfaces of walls 80 are spaced sufficiently from groove 40 so that they do not engage the periphery of the capillary tube disposed therein.

Each opposed end of base section 28 is formed with threads 108. Threads 108 are formed at a right angle with grooves 42 and 44 respectively and extend along base portion 28 for a length substantially equivalent to groove 42, 44.

As shown clearly in FIGS. 1–3 the top section 26 also includes a pair of pressure applying members in the form of respective cantilever beams 82 and 84. The beams are elongated, finger-like members which project inward from respective end walls 74 of top section 26 through windows 66 and 70, respectively. Each of the beams 82 and 84 includes an intermediate portion 86 projecting downward from the inner surface of the end wall 74 at the slight angle, e.g., 9°, to the top wall 64 and terminating in a free-end portion 88. Each free end portion 88 is biased so that it normally extends downward at the single angle, e.g., 2°, to the plane of the base wall portions 36 and 38 when the two sections are snap-fit together but before introduction of the optical fibers therein. Each of the cantilever beams 82 and 84 extends parallel to the longitudinal central axis of the housing assembly 22 so that when the two sections 26 and 28 are snap-fit together the free end portion 88 of each beam extends along and over the longitudinal groove 42 and 44 which is disposed thereunder to form a respective tapering space therebetween. The bottom surface of each of the free ends portions 88 is designated by the reference numeral 90 and serves as an engagement surface to engage the optical fiber cladding adjacent the bare free end of the fiber disposed thereunder.

As can be seen clearly in FIGS. 2 and 3, each end wall 74 of the cover 26 includes a flared recess 92 tapering downward from the outside surface of the end wall to the inside surface. Each recess 92 cooperates with an associated flared recess 46 in the bottom section when the sections are secured together to form a respective tapered access mouth into which the free end of a respective fiber is inserted. Respective ends of top section 26 are also threaded with threads 110, respectively. Threads 110 are spaced and dimensioned so that when bottom portion 28 is secured to top portion 26 with locking tabs 76, threads 108 and 110 cooperate to form a continuous thread about the respective ends of housing assembly 22.

Collet 102 is positioned at a first end of housing assembly 22. Collet 104 is positioned at a second end of housing assembly 22. Collet 102 is identical to collet 104 and therefore will be described in detail being exemplary for both. Like numerals indicate like structures.

Collet 102 includes a neck 112 having a channel 114 extending substantially coaxially therethrough. The diameter of channel 114 is slightly greater than the plastic buffer of the optical fiber. Four fingers 115 are integrally formed with neck 112. An opening 116 formed at a position central to fingers 115. Each finger 115 is separated from an adjacent finger 115 by a slit 118 formed therebetween. Slit 118 allows for movement of one finger 115 relative to another so that fingers 115 may collapse about channel 114 or expand away from channel 114. In a relaxed state, the diameter of channel 114 between fingers 115 is greater than the diameter of the plastic buffer of the optical fiber. Fingers 115 are tapered so as to be seated within the taper formed by flared recesses 92 and 46 aligning collet 102 and channel 114 relative to the channel within housing assembly 22 formed by grooves 42, 44.

An adapter 120 dimensioned to be received within channel 114 includes a stem 122 and a collar 124 and is used to guide small diameter buffered optical fibers, i.e. between 250 and 500 microns. Stem 122 has a diameter less than the diameter of channel 114 and is received within collet 102. Collar 124 has a diameter greater than channel 114 and therefore abuts against neck 112 maintaining adapter 120 in place. Adapter 120 is formed with a channel 126 extending throughout its entire length. Channel 126 is dimensioned slightly greater than 500 microns. Adapter 120 is optional and need only be used when the buffer of the optical fiber has a diameter of 500 microns or less.

Lock nut 100 includes a cylindrical portion 129 which is integrally formed with a collar 128 which is separated from cylindrical portion 129 by a tapered section 130. A channel 132 is formed within collar 128 having a diameter less than the interior of cylindrical portion 129. The diameter of the interior of the cylindrical portion 129 is substantially equal to the diameter of the continuous threads formed by threads 108, 110. The diameter of channel 132 at collar 128 is slightly greater than the outer diameter of neck 112 of collet 102. Ribs 136 are formed at spaced intervals about the interior of cylindrical portion 129 of locking nut 100. Ribs 136 are dimensioned to extend within locking nut 100 a distance that reduces the effective interior diameter of cylindrical portion 129 to be less than the outer diameter of the threads formed by threads 108, 110. Because lock nut 100 is formed from glass filled nylon which is softer than a liquid crystal polymer, when lock nut 100 or 106 is twisted about either end of housing assembly 22, threads 108, 110 carve cooperating threads into ribs 136. To facilitate twisting of lock nuts 100, 106 the outer surface of cylindrical section 129 is knurled.

In order to prepare optical fibers introducing into the splice assembly 20, each optical fiber is stripped of its plastic buffer for a length necessary for proper cleaving from its free end, and then the bare free end of the fiber is cleaved so that it is planar, perpendicular to its longitudinal central axis, and smooth, with the bare free end extending no more than approximately 6 mm from the end of the cladding. Once the two fibers are so prepared they may be introduced into the housing assembly 22 to complete the splice.

When utilizing a buffered optical fiber having a diameter of 500 microns or less, adapter 120 is slid into collet 102 through neck 112 until collar 124 abuts neck 112. The collet assembly is then inserted within lock nut 100 so that neck 112 and collar 124 extend through collar 128. The prepared end of an optical fiber is then inserted through channel 126 and through fingers 115. Fingers 115 are positioned within recesses 92, 46. The same process is repeated for collet 104 and locking nut 106.

Housing assembly 22 is now ready to receive the free ends of the fibers from opposite ends thereof. Thus, the optic fiber with its bare free end portion is introduced into the mouth at one end, e.g., the left side end, of housing assembly 22. The fiber is then slid along in the groove 42. As the bare free end of the fiber passes down the groove toward the capillary tube 24 it is not engaged by the surface 90 at the free end portion 88 of the cantilever arm 82, i.e., the space between the surface and the underlying groove 42 is wider than the diameter of the bare free end of the fiber. Once the bare free end reaches the tapered recess 48 it is guided into recess 50 and hence into the immediately adjacent flared open end of the central passageway 34 in the capillary tube.

It should be noted that at the point at which the fiber's free end enters the capillary tube 24 the engagement surface 90 of the cantilever beam 82 rides up into contact with the cladding on the fiber. This causes the free end portion 88 of the cantilever beam 82 to flex against its natural bias, thereby applying downward pressure on the portion of the fiber disposed thereunder. The bias force applied by the beam is not so great as to impede the fiber from being slid further into the capillary tube, but is sufficient to prevent it from accidentally sliding out.

Once the free end of the fiber has been pushed into the capillary tube 24 to approximately the middle of it, the other optical fiber is introduced into housing assembly 22 in a similar manner. Thus, the bare free end of the fiber is introduced through the flared mouth at the opposite end of housing assembly 22 and into the aligned groove 44. The fiber is then slid along that groove in the same manner as described heretofore.

By virtue of the fact that the central passageway 34 of the capillary tube is square in cross-section four interstitial spaces are produced between the outer periphery of the bare optical fiber ends and the planar walls making up the capillary tube's passageway. These interstitial spaces serve to vent any air from the central passageway as the fibers are inserted therein. For example, as the second fiber is inserted into the capillary the air (and possibly some of the index matching gel) is enabled to vent through the interstitial spaces. This action insures that the two fiber ends about each other in a good, light-transmissive joint. The gel is provided to further insure that the joint is light tight, i.e., to prevent any light from leaking out of the interface and to facilitate light transmission therebetween.

Once the fibers are in an abutted position, locking nut 100 is rotated about threads 108, 110. Threads 108, 110 cut a thread within ribs 136 of locking nut 100. Because the diameter of ribs 136 is less than the outer diameter of housing assembly 22 including threads 108, 110, lock nut 100 further tightens cover portion 26 against base portion 28 causing recesses 46, 92 acting on the tapered portions of finger 115 to tighten about opening 116 and the optical fiber contained therein. Additionally, as locking nut 100 is rotated, it moves along threads 108, 110 in the direction of capillary tube 24 so that slanted section 130 of lock nut 100 pushes against the rear of fingers 115 anchoring fingers 115 into the tapered surface formed by recesses 46, 92. The tapered surfaces of recesses 46, 92 and fingers 115 sliding along each other force fingers 115 to collapse upon each other, further tightening fingers 115 about the optical fiber. As a result fingers 115 clamp about the optical fiber. A similar process is performed about the mating optical fiber utilizing locking nut 106. As discussed above, this structure may be utilized without adapter 120 if a buffer having a diameter greater than 500 microns is utilized.

To reuse optical fiber splice 20, lock nut 100 is turned in the opposite direction as originally turned in screwing lock nut 100 onto housing assembly 22. This in turn allows collet 102 to slip from between recesses 46, 92 loosening the grip of fingers 115 about the optical fiber allowing removal of the optical fiber. Another optical fiber is merely inserted through adapter 120 and lock nut 100 already having the thread pattern formed therein is twisted about housing assembly 22 returning it to the fiber optic hold position. It should be noted, that lock nut 100 operates independently of lock nut 106 so that the fiber optic which need not be replaced need not be removed during the resplicing operation.

By providing an optical splice having a housing which is threaded at each end, a collet having fingers and a lock nut for forcing the collet for tightening the fingers as the locking nut is rotated about the housing assembly, a reusable optical fiber splice maintains the optical fibers in proper position even when a force is applied upon the optical fiber.

It will thus be seen that the object set forth above, among those made apparent from the preceding description are efficiently obtained and, some certain changes may be made in the construction set forth without departing from the spirit and scope of the invention, it is intended that all matter contained in the above description and shown in the accompanying drawings shall be interpreted as illustrative and not in the limiting sense.

It is also to be understood that the following claims are intended to cover all the generic and specific features of the invention herein described and all statements of the scope of the invention which as a matter of language might be said to fall therebetween.

What is claimed is:

1. An optical fiber splice for splicing the free end of a first optical fiber to the free end of a second optical fiber, each of said optical fibers being of a predetermined diameter, said optical fiber splice comprising housing means, a capillary tube disposed within said housing means for receiving said free end of a first optical fiber and said free end of a second optical fiber, said capillary tube comprising an elongated non-deformable member; and releasable holding means for releasably selectively holding at least one optical fiber fixedly in position within said housing means; said releasable holding means applying a holding pressure to said first optical fiber and second optical fiber away from said capillary tube.

2. An optical fiber splice for splicing the free end of a first optical fiber to the free end of a second optical fiber, each of said optical fibers being of a predetermined diameter, said optical fiber splice comprising housing means; a capillary tube disposed within said housing means, said capillary tube comprising an elongated member; and releasable holding means for releasably selectively holding at least one optical fiber fixedly in position within said housing; said releasable holding means including a collet having a neck formed with a channel therethrough and a plurality of fingers, said fingers adapted to move relative to each other, said fingers selectively applying a pressure to said optical fiber to maintain said optical fiber in position.

3. The optical fiber splice of claim 2, wherein said housing assembly includes a first end, said first end being formed with a tapered surface, each finger having a tapered surface, said fingers being disposed within said tapered surface of said first end; and lock nut means for forcing said fingers against said tapered surface of said first end tightening the fingers about said optical fiber.

4. The optical fiber splice of claim 3, wherein said lock nut means includes a lock nut having an interior surface, a plurality of ribs formed along said interior surface, and said housing means formed of a plurality of threads formed about said first end, the outer diameter of said threads being greater than the inner diameter of said lock nut means.

5. The optical fiber splice of claim 4, wherein said ribs are formed from a material having a hardness less than the hardness of said threads.

6. The optical fiber splice of claim 2, wherein said housing means includes a first body portion and a second body portion, securing means integrally formed on at least one of said first body portion and said second body portion for selectively securing said first body portion to said second body portion.

7. The optical fiber splice of claim 6, further comprising positioning means for positioning the first and second optical fiber within said housing means while allowing the first and second optical fiber to move in a direction substantially parallel to a lengthwise direction of said housing means.

8. The optical fiber splice of claim 2, further comprising positioning means for positioning the first and second optical fiber within said housing means while allowing the first and second optical fiber to move in a direction substantially parallel to a lengthwise direction of said housing means.

9. The optical fiber splice of claim 2, wherein said capillary tube is formed of glass.

10. The optical fiber splice of claim 9, wherein said housing means includes a window means formed therein for allowing inspection of said capillary tube.

11. An optical fiber splice for splicing the free end of a first optical fiber to the free end of a second optical fiber, each of said optical fibers being of a predetermined diameter, said optical fiber splice comprising housing means; a capillary tube disposed within said housing means, said capillary tube comprising an elongated member; releasable holding means for releasably selectively holding at least one optical fiber fixedly in position within said housing, said releasable holding means including a neck having a channel therethrough and a plurality of fingers, said fingers adapted to move relative to each other, said fingers selectively applying a pressure to said optical fiber to maintain said optical fiber in position, said housing assembly including a first end, said first end being formed with a tapered surface, each finger having a tapered surface, said fingers being disposed within said tapered surface; and lock nut means for forcing said fingers against said tapered surface tightening the fingers about said optical fiber, said lock nut means including a lock nut having an interior surface, a plurality of ribs foraged along said interior surface, a plurality of threads formed about said housing means, the outer diameter of said threads being greater than the inner diameter of said lock nut means formed by said ribs; positioning means for positioning the first and second optical fiber within said housing means while allowing the first and second optical fiber to move in a direction substantially parallel to a lengthwise direction of said housing means.

12. The optical fiber splice of claim 11, wherein said ribs are formed of a material having a hardness less than the hardness of said threads.

13. The optical fiber splice of claim 11, wherein said housing means includes a first body portion and a second body portion, securing means integrally formed on at least one of said first body portion and said second body portion for selectively securing said first body portion to said second body portion.

14. The optical fiber splice of claim 11, further comprising a capillary tube passageway formed within said capillary tube; and wherein said housing means further comprises first and second support surfaces, said first support surface being disposed adjacent to one end of said capillary tube and aligned with a longitudinally extending portion of said capillary tube passageway, said second support surface being disposed adjacent the other end of said capillary tube and aligned with said longitudinally extending portion of said passageway, said first support surface being arranged to support thereon a first portion of said first optical fiber, and with the free end of said first optical fiber extending into said capillary tube passageway, said second support surface being arranged to support thereon a second portion of said second optical fiber, and with the free end of said second optical fiber extending into said capillary tube passageway so that the free ends abut therein, said positioning means being arranged to initially hold said first portion of said first optical fiber securely onto to said first support surface while allowing said first optical fiber to slide therebetween and said second portion of said second optical fiber securely onto said second support surface while allowing said second optical fiber to slide therebetween when said first body portion is secured to said second body portion so that said abutting optical fiber ends are in engagement with each other.

15. An optical fiber splice for splicing the free end of a first optical fiber to the free end of a second optical fiber, each of said optical fibers being of a predetermined diameter, said optical fiber splice comprising housing means; a capillary tube disposed within said housing means, said capillary tube comprising an elongated member; and releasable holding means for releasably selectively holding at least one optical fiber fixedly in position within said housing means; said housing means including a first body portion and a second body portion, securing means integrally formed on at least one of said first body portion and said second body portion for selectively securing said first body portion to said second body portion; positioning means for positioning the first and second optical fiber within said housing means while allowing the first and second optical fiber to move in a direction substantially parallel to a lengthwise direction of said housing means; further comprising a capillary tube passageway formed within said capillary tube and wherein said housing means further comprises first and second support surfaces, said first support surface being disposed adjacent to one end of said capillary tube and aligned with a longitudinally extending portion of said passageway, said second support surface being disposed adjacent the other end of said capillary tube and aligned with said longitudinally extending portion of said capillary tube passageway, said first support surface being arranged to support thereon a first portion of said first optical fiber, and with the free end of said first optical fiber extending into said capillary tube passageway, said second support surface being arranged to support thereon a second portion of said second optical fiber, and with the free end of said second optical fiber extending into said capillary tube passageway so that the free ends abut therein, said positioning means including a member being arranged to initially hold said first portion of said first optical fiber securely onto to said first support surface while allowing said first optical fiber to slide therebetween and holding said second portion of said second optical fiber securely onto said second support surface while allowing said second optical fiber to slide therebetween when said first body portion is secured to said second body portion so that said abutting optical fiber ends are in engagement with each other.

16. The optical fiber splice of claim 15, wherein said positioning means comprises a biased beam having an elongated engaging surface which is disposed over a respective one of said first and second support surfaces to form a space adapted to receive the free end portion of a respective one of said first and second optical fibers with each of said engaging surfaces being arranged to engage respective first and second portions of said optical fibers as said optical fibers enter said space.

* * * * *